(12) United States Patent
Dagman

(10) Patent No.: US 8,386,316 B1
(45) Date of Patent: Feb. 26, 2013

(54) METHOD AND SYSTEM TO GRANT REMOTE ACCESS TO VIDEO RESOURCES

(76) Inventor: Vadim Dagman, Foster City, CA (US)

( * ) Notice: Subject to any disclaimer, the term of this patent is extended or adjusted under 35 U.S.C. 154(b) by 472 days.

(21) Appl. No.: 12/173,700

(22) Filed: Jul. 15, 2008

(51) Int. Cl.
  *G06Q 30/00* (2012.01)
(52) U.S. Cl. ........................ 705/14.49; 705/14.4; 705/35
(58) Field of Classification Search .................... 705/35, 705/14.4–14.49
See application file for complete search history.

(56) References Cited

U.S. PATENT DOCUMENTS

| | | | | |
|---|---|---|---|---|
| 7,818,392 | B1* | 10/2010 | Martino et al. | 709/217 |
| 2006/0085259 | A1* | 4/2006 | Nicholas et al. | 705/14 |
| 2007/0038931 | A1* | 2/2007 | Allaire et al. | 715/526 |
| 2008/0077953 | A1* | 3/2008 | Fernandez et al. | 725/32 |
| 2008/0109306 | A1* | 5/2008 | Maigret et al. | 705/14 |
| 2008/0222295 | A1* | 9/2008 | Robinson et al. | 709/227 |
| 2008/0287096 | A1* | 11/2008 | Aaltonen et al. | 455/406 |
| 2008/0288494 | A1* | 11/2008 | Brogger et al. | 707/7 |
| 2009/0018904 | A1* | 1/2009 | Shipman et al. | 705/14 |
| 2009/0132311 | A1* | 5/2009 | Klinger et al. | 705/7 |
| 2009/0150947 | A1* | 6/2009 | Soderstrom | 725/93 |
| 2009/0192928 | A1* | 7/2009 | Abifaker | 705/35 |
| 2009/0234732 | A1* | 9/2009 | Zorman et al. | 705/14 |

* cited by examiner

Primary Examiner — Lalita M Hamilton
(74) Attorney, Agent, or Firm — Kevin Roe

(57) ABSTRACT

A method and system to control at least one remote video resource access system. A first embodiment is a method to operate a remote video resource access system. The method includes publishing an access link on a website to a video resource of a grantor; detecting activation of the access link by a prospective grantee; obtaining the prospective grantee identity from a website user file to determine if the prospective grantee should be a grantee; providing an advertising opportunity to a prospective advertiser regarding the prospective grantee; and granting the prospective grantee access to the video resource of the grantor, within one or more limits optionally imposed by the grantor on the scope of the access being offered. A second embodiment is a remote video resource access system. The system includes a module to publish an access link on a website to a video resource of a grantor; a module to detect activation of the access link by a prospective grantee; a module to obtain the prospective grantee identity from a website user file to determine if the prospective grantee should be a grantee; a module to provide an advertising opportunity to a prospective advertiser regarding the prospective grantee; and a module to grant the prospective grantee access to the video resource of the grantor, within one or more limits optionally imposed by the grantor on the scope of the access being offered. These embodiments can be applied in several wired and wireless communication applications, even combinations of wired and wireless technologies including, but not limited to, IEEE 802.16 wireless applications.

20 Claims, 8 Drawing Sheets

US 8,386,316 B1

METHOD AND SYSTEM TO GRANT REMOTE ACCESS TO VIDEO RESOURCES

BACKGROUND OF THE INVENTION

1. Field of the Invention

This invention relates to a method and system to grant and control remote access of prospective grantees to video resources of grantors on an Internet website, and more particularly to methods and systems to enable the grant of remote viewing privileges from a grantor to a grantee through an Internet website.

2. Description of the Prior Art

Social networking websites (e.g., MySpace, Facebook, and equivalent websites) are popular for participants to share information about themselves with other participants. Typically, there is some information provided by a participant to a social networking website before they can contribute any postings to the website. Such information could be of interest to potential advertisers in regards to targeting specific advertisements to people most likely to be receptive to the advertisements.

There are also participants on the website that reside in different geographical areas (e.g., different cities, different states, different countries, and/or different continents), having access to different video resources possibly in different languages, that are not generally available to the participants located in other geographical areas. Examples of such video resources could be live ground-based or satellite television broadcast, television cable network or equivalents. With the advent of place-shifting video equipment that enables remote viewing of a person's own television through the Internet, it is possible to imagine that other people could also be interested in seeing what is available to be seen on another person's television, especially in other geographical locations.

One problem is the need to organize a system and method for making available video resources of a grantor for remote access by a grantee. Another problem is how to protect the rights of the content owners (e.g., ABC, Disney, and equivalent content owners) and/or the service providers (e.g., Comcast, Dish Networks, and equivalent providers) by generating additional stream of revenue for them. Yet another problem is how to control the access of grantees to the video resources of a grantor, and how this remote viewing access could be made available on a practical and economically sustainable basis on the Internet, given the costs associated with using up the Internet bandwidth and other related costs.

In view of the foregoing, what is needed is a method and system to control the remote viewing of video resources of one person by another person. Various wired and wireless audio/video applications could contribute to such methods and systems.

SUMMARY OF THE INVENTION

The present invention can be implemented in numerous ways, such as by a method or a system. Two aspects of the invention are described below.

A first aspect of the invention is directed to a method to operate a remote video resource access system. The method includes publishing an access link on a website to a video resource of a grantor; detecting activation of the access link by a prospective grantee; obtaining the prospective grantee identity from a website user file to determine if the prospective grantee should be a grantee; providing an advertising opportunity to a prospective advertiser regarding the prospective grantee; and granting the prospective grantee access to the video resource of the grantor, within one or more limits optionally imposed by the grantor on the scope of the access being offered.

A second aspect of the invention is directed to a remote video resource access system. The system includes an access link publication module to publish an access link on a website to a video resource of a grantor; an access activation module to detect activation of the access link by a prospective grantee; an identification module to obtain the prospective grantee identity from a website user file to determine if the prospective grantee should be a grantee; an advertising decision module to provide an advertising opportunity to a prospective advertiser regarding the prospective grantee; and an access decision module to grant the prospective grantee access to the video resource of the grantor, within one or more limits optionally imposed by the grantor on the scope of the access being offered.

These and other objects and advantages of the invention will become apparent to those skilled in the art from the following detailed description of the invention and the accompanying drawings.

DETAILED DESCRIPTION OF THE PREFERRED EMBODIMENT

Figure 1:
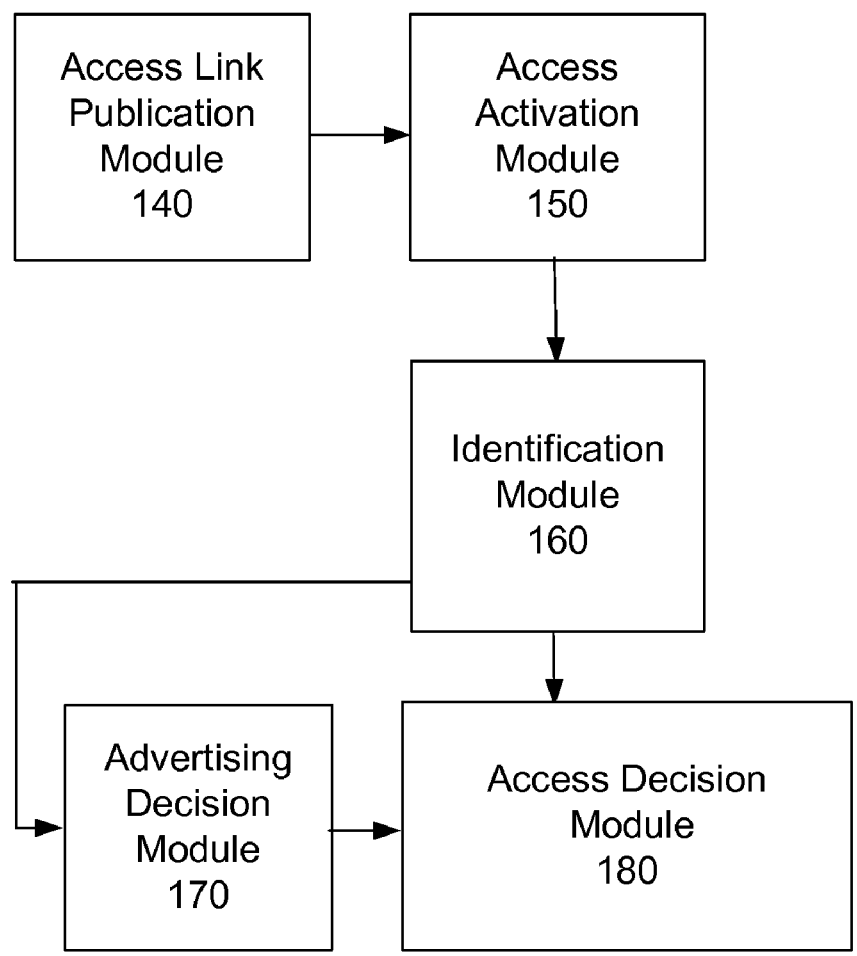
FIG. 1 illustrates a block diagram of a remote video resource access system, in accordance with one embodiment of the invention.

The invention provides a method and a system to operate a remote video resource access system, which could be used in either wired or wireless communication systems that provide audio and/or video information. Various embodiments of the invention can be applied to communication applications, biological applications, medical applications, electronic applications, and any other applications where such methods and systems can be beneficially used. In this specification, drawings, and claims, any instance of the term "wireless" or "radio-frequency" is defined as any electromagnetic signal frequency in the frequency range of 50,000 to 100,000,000,000 cycles per second (Hertz). However, the scope of the invention should not be considered to be limited only to communication systems in accordance to these technical specifications. Certain embodiments of the invention are also applicable to other data transmission technologies, using cable communications, optical fiber communications, and other wired and wireless communications.

The present invention includes various operations and/or modules, which will be described below. The operations of the present invention may be performed by hardware components or may be embodied in machine-executable instructions, which may be used to cause a general-purpose or special-purpose processor programmed with the instructions to perform the operations. In certain embodiments, the method may be performed by processing logic that may comprise hardware (e.g., dedicated logic, programmable logic, microcode, or an equivalent), software (such as instructions executed on a general purpose computer system, a dedicated machine, or an equivalent data processing system), or a combination of both hardware and software modules.

The present invention may be provided as a computer program product, or software, that may include a machine-readable medium having stored thereon instructions, which may be used to program a computer system (or other equivalent data processing systems or electronic devices) to perform a process according to the present invention. A machine-readable medium includes any mechanism for storing or transmitting information in a form (e.g., software, processing application) readable by a machine (e.g., a computer, or an equivalent data processing system or electronic device). The machine-readable medium may includes, but is not limited to, magnetic storage medium (e.g., floppy diskette); optical storage medium (e.g., CD-ROM, DVD, or an equivalent); magneto-optical storage medium; read only memory (ROM); random access memory (RAM); erasable programmable memory (e.g., EPROM, EEPROM, or an equivalent); flash memory; electrical, optical, acoustical or other form of propagated signal (e.g., carrier waves, infrared signals, digital signals, or an equivalent); or other type of medium suitable for storing electronic instructions. The present invention may also be practiced in distributed computing environments where the machine-readable medium is stored on and/or executed by more than one data processing system.

Audio/video recorders (henceforth for simplicity referred to below as video recorders) can be used in applications supporting remote access to audio/video devices and/or other devices. Such applications include controlling recording sessions and controlling transmissions to other devices. Such applications can involve audio and/or video transmissions over cable or other types of networks, or the transmission can be by wireless transmissions using various protocols (e.g., IEEE 802.16(g) for wireless radio-frequency networks, or an equivalent).

FIG. 1 illustrates a block diagram of a remote video resource access system, in accordance with one embodiment of the invention. This system includes an access link publication module 140, an access activation module 150, an identification module 160, an advertising decision module 170, and an access decision module 180. In one embodiment of the invention, this system would reside within a primary data processing system (e.g., a personal computer, or an equivalent). In an alternative embodiment of the invention, this system has one or more of the modules residing outside of the primary data processing system and externally connected to the primary data processing system.

In the embodiment illustrated in FIG. 1, the access link publication module 140 would be integrated into the website software (e.g., social networking website software, or an equivalent) in order to publish a link to the video resources (e.g., television receiver, cable input, or an equivalent) of a grantor (e.g., a person willing to share access to their video resources within one or more optionally imposed limits on the scope of the access being offered, e.g., a pre-determined time, channel scope, or an equivalent limit). The access activation module 150 would be integrated into the website software (e.g., social networking website software, or an equivalent) in order to provide access to the video resources (e.g., television receiver, cable input, or an equivalent) of a grantor (e.g., a person willing to share access to their video resources within one or more optionally imposed limits on the scope of the access being offered). The identification module 160 would also be integrated into the website software (e.g., social networking website software) in order to identify a prospective grantee that wants to remotely access the video resources of the grantor. The advertising decision module 170 would also be integrated into the website software to determine whether or not any advertising would be displayed to the prospective grantee, based on one or more criteria (e.g., whether or not any advertiser is willing to pay for a portion or for all of the cost of an access link connection, such as the cost of the uplink data traffic of the grantor, the cost of the download data traffic of the grantee and other internet related costs, and other costs and fees associated with sharing of copyrighted content, the subject matter of the access requested, the age or gender of the prospective grantee, the geographical location of the prospective grantee, the geographical location of the grantor, or an equivalent criteria).

The access decision module 180 would also be integrated into the website software to determine whether or not the prospective grantee will be given access to the video resources of the grantor, based on one or more criteria (e.g., whether the prospective grantee is specifically listed on a block list, whether the prospective grantee meets all requirements for access (e.g., age, gender, location, or an equivalent), whether or not any advertiser is willing to pay for a portion or for all of the cost of an access link connection and other costs and fees associated with sharing of copyrighted content, whether the prospective grantee has a credit balance to pay in points for the access, based on previously being a grantor themselves of remote access to their own video resources and having received some credit balance of points allowing viewing rights, or whether the prospective grantee is willing to pay for the access, or an equivalent criteria). It should be noted that in one embodiment of the invention, the grantor and prospective grantee could simply trade access to the video resources of each other, which would be a more limited barter version of a credit balance point system, where a grantor receives a credit balance for being an actual grantor, which the grantor could apply to their credit balance to use for remote viewing rights to the video resources of some other grantor. Access grant would grant the prospective grantee access to the video resource of the grantor, within one or more limits optionally imposed by the grantor on the scope of the access being offered.

The video resource provided by the grantor for remote viewing access can come in an analog format (e.g., component video, Video Graphics Array (VGA), or an equivalent) or a digital format (e.g., High-Definition Multimedia Interface (HDMI), Digital Visual Interface (DVI), IEEE 1394 (FireWire), Serial Digital Interface (SDI), High Definition Serial Digital Interface (HD-SDI), TOSLINK® optical, EIAJ optical, ADAT optical, composite coax digital, or an equivalent).

Figure 2:
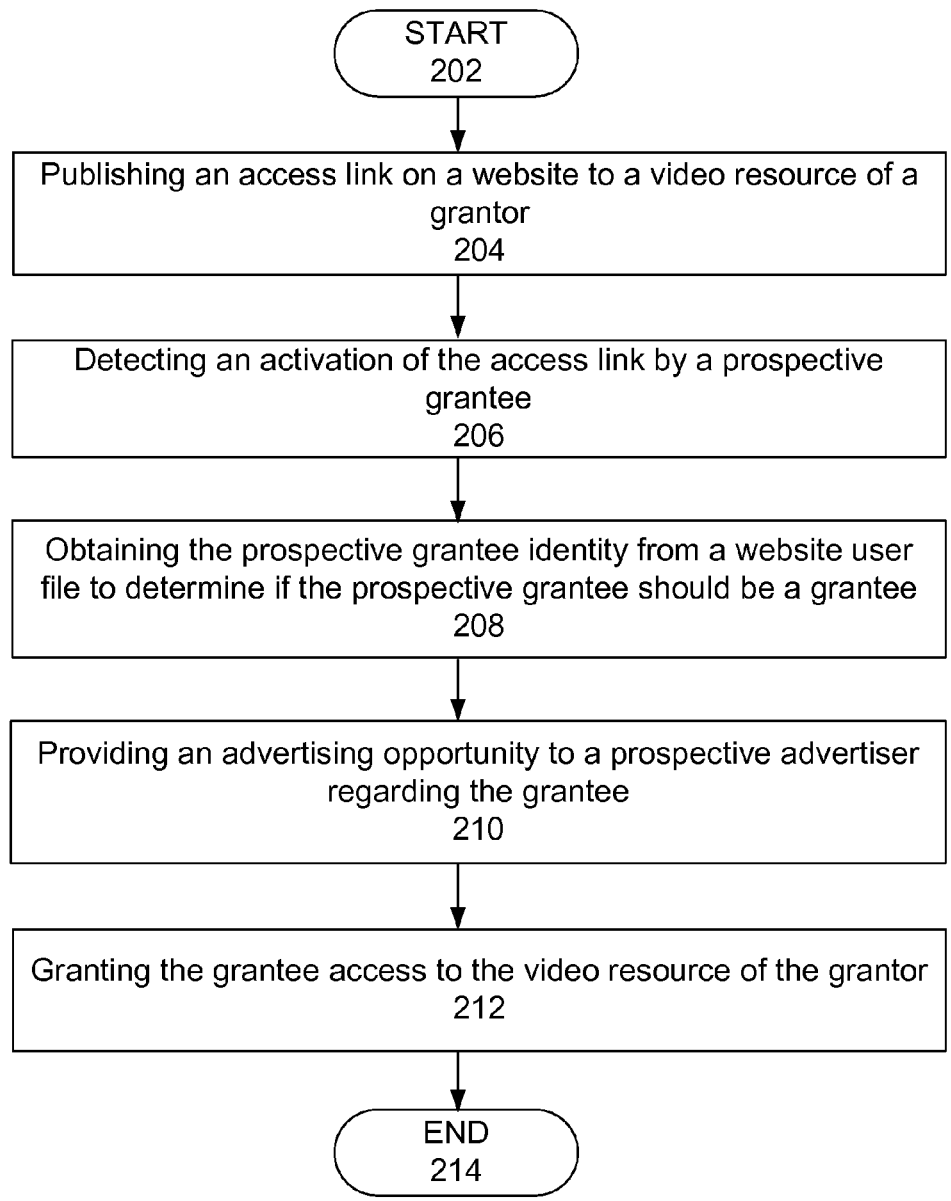
FIG. 2 illustrates a flowchart of a method to operate a remote video resource access system, in accordance with one embodiment of the invention.

FIG. 2 illustrates a flowchart of a method to operate a remote video resource access system, in accordance with one embodiment of the invention. The method starts in operation 202. Operation 204 is next and includes publishing an access link on a website (e.g., a social networking website) to a video resource of a grantor, with information about the video resource being offered, the location, and one or more limits optionally imposed by grantor on the scope of the access being offered for access. Operation 206 is next and includes detecting activation of the access link by a prospective grantee. Operation 208 is next and includes obtaining the prospective grantee identity from a website user file (e.g., social networking website background file on the user) to determine if the prospective grantee should be a grantee. Operation 210 is next and includes providing an advertising opportunity (e.g., with advertising based on one or more of the following criteria: whether or not any advertiser is willing to pay for a portion or for all of the cost of an access link connection and other costs and fees associated with sharing of copyrighted content, available information about the grantee, the subject matter of the access link, the geographical location of the grantee, the geographical location of the grantor, or an equivalent) to a prospective advertiser regarding the grantee. Operation 212 is next and includes granting the grantee access to the video resource of the grantor, within one or more limits optionally imposed by grantor on the scope of the access being offered (e.g., a pre-determined time, channel scope, and/or an equivalent limit). The method ends in operation 214.

Figure 3:
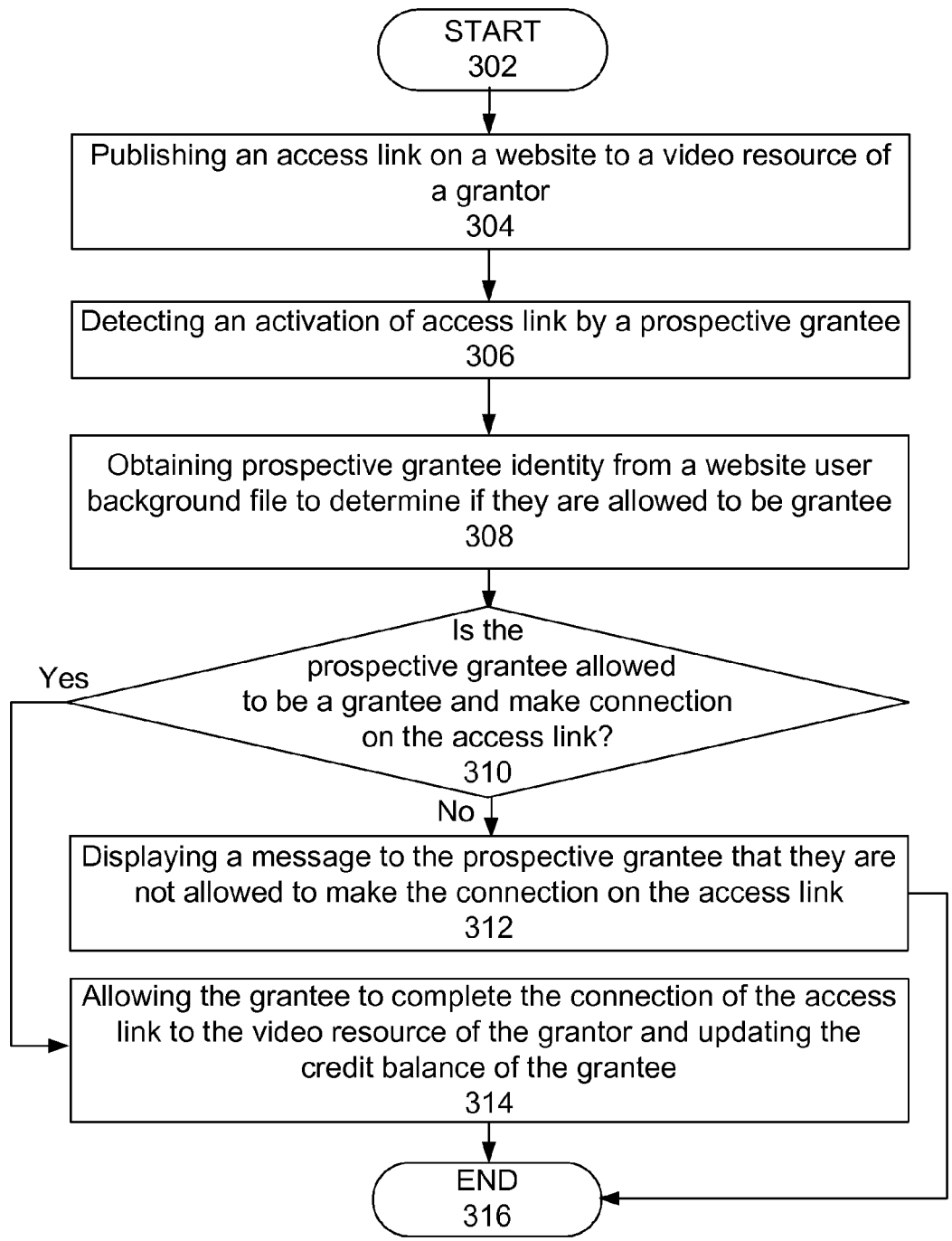
FIG. 3 illustrates a flowchart of a method to operate a remote video resource access system, in accordance with one embodiment of the invention.

FIG. 3 illustrates a flowchart of a method to operate a remote video resource access system, in accordance with one embodiment of the invention. The method starts in operation 302. Operation 304 is next and includes publishing an access link on a website (e.g., a social networking website, or an equivalent) to a video resource of a grantor, with information about the video resource being offered, the location, and one or more limits optionally imposed by grantor on the scope of the access being offered for access. Operation 306 is next and includes detecting activation of the access link by the prospective grantee. Operation 308 is next and includes obtaining the prospective grantee identity from a website user file (e.g., social networking website background file on the user, or an equivalent) to determine if the prospective grantee should be a grantee. Operation 310 is next and includes determining if the prospective grantee should be allowed to be a grantee to complete the connection on the access link. In one embodiment of the invention, this operation would also include providing an advertising opportunity (e.g., with advertising based on available information about the grantee, the subject matter of the access link, the geographical location of the grantee, the geographical location of the grantor, or an equivalent) to a prospective advertiser regarding the grantee. If the test of the operation 310 determines that they should be a grantee, then operation 314 is next. Operation 314 includes allowing the grantee to complete the connection of the access link to the video resource of the grantor, within one or more limits optionally imposed by the grantor (e.g., a pre-determined time, channel scope, or an equivalent). Operation 316 would be next and be the end of the method. However, if the test of operation 310 determines they should not be a grantee, then operation 312 would be next. Operation 312 includes displaying a message to the prospective grantee that they are not allowed to make the connection on the access link. In one embodiment of the invention, the reason or reasons would be provided for the denial of access. In one embodiment of the invention, if no advertiser would pay for the prospective grantee access, the prospective grantee would be allowed to make the access link connection if they pay with cash or credits for the access link connection. Then operation 316 would be next and the method would end.

Figure 4:
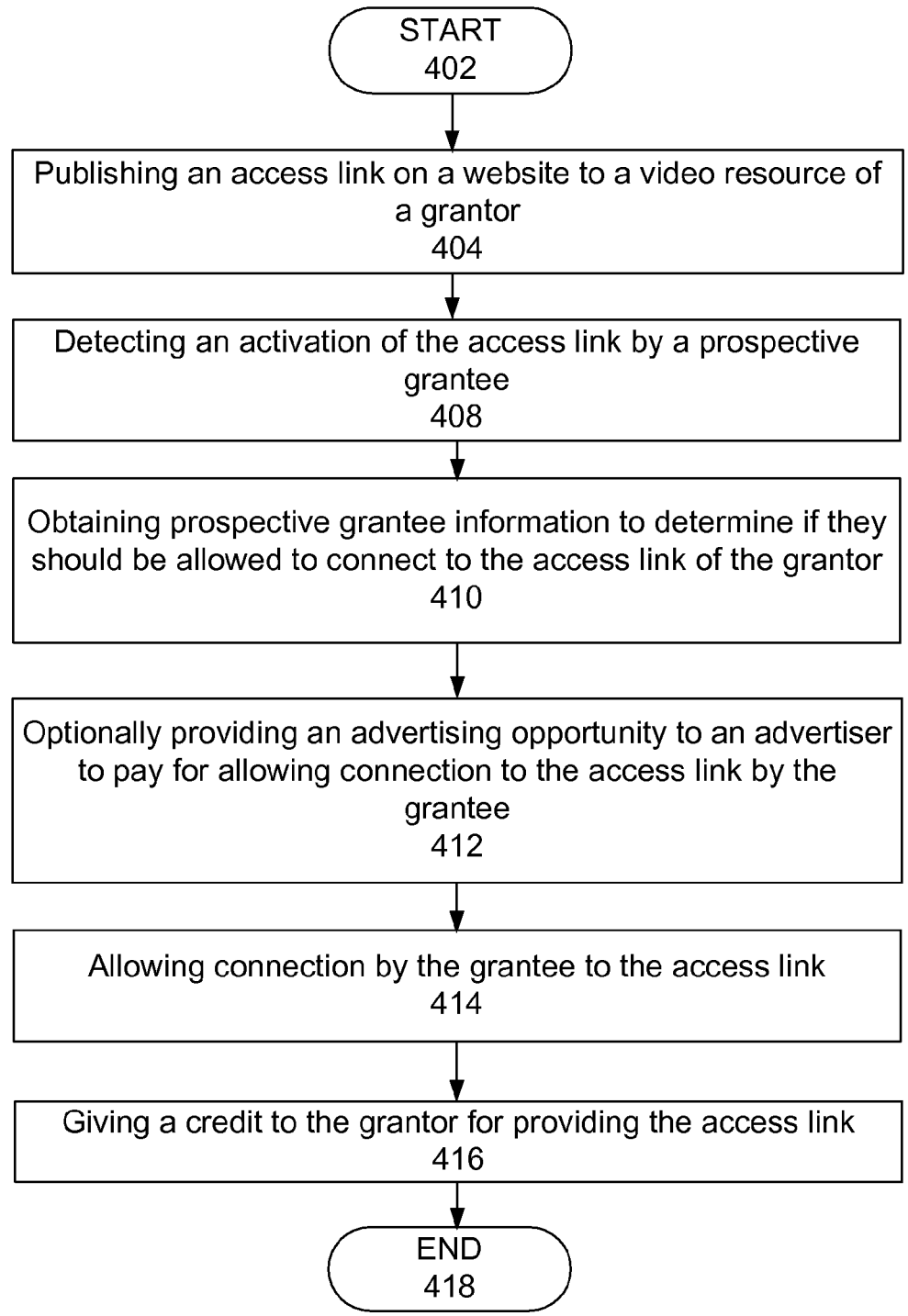
FIG. 4 illustrates a flowchart of a method to operate a remote video resource access system, in accordance with one embodiment of the invention.

FIG. 4 illustrates a flowchart of a method to operate a remote video resource access system, in accordance with one embodiment of the invention. The method starts in operation 402. Operation 404 is next and includes publishing an access link on a website (e.g., a social networking website, or an equivalent) to a video resource of a grantor, with information about the video resource being offered, the location, and one or more limits optionally imposed by grantor on the scope of the access being offered for access. Operation 408 is next includes detecting activation of the access link by the prospective grantee. Operation 410 is next and includes obtaining the prospective grantee information (e.g., identity, background, credit balance, or other information) from a website user file (e.g., social networking website background file on the user) to determine if the prospective grantee should be a grantee and allowed to connect to the access link of the grantor. Operation 412 is next and includes providing an advertising opportunity (e.g., with advertising based on available information about the grantee, the subject matter of the access link, the geographical location of the grantee, the geographical location of the grantor, or an equivalent) to a prospective advertiser to optionally pay for the access link for the grantee and other costs and fees associated with sharing of copyrighted content. Operation 414 is next and includes granting the grantee access to the video resource of the grantor, within one or more limits optionally imposed by grantor on the scope of the access being offered (e.g., a pre-determined time, channel scope, or an equivalent). Operation 416 is next and includes giving the grantor a credit for providing an access link to the video resources, optionally in proportion to the duration of time for which they are utilized by the grantee. In one embodiment without full payment for the access link and other costs and fees associated with sharing of copyrighted content by an advertiser, this operation would also include deducting an appropriate credit or cash price from the credit balance of the grantee for getting an access link to the video resources of a grantor, optionally in proportion to the duration of time that they are utilized by the grantee. In alternative embodiments the grantor can earn credit besides granting the access (e.g., the grantor can simply buy credit points with money). The money paid by an advertiser, a grantor or a grantee can be shared with the content owners (e.g., ABC, Disney, and equivalent content owners), the television service providers (e.g., Comcast, Dish Networks, and equivalent providers) and/or the Internet service providers. The method ends in operation 418.

Figure 5:
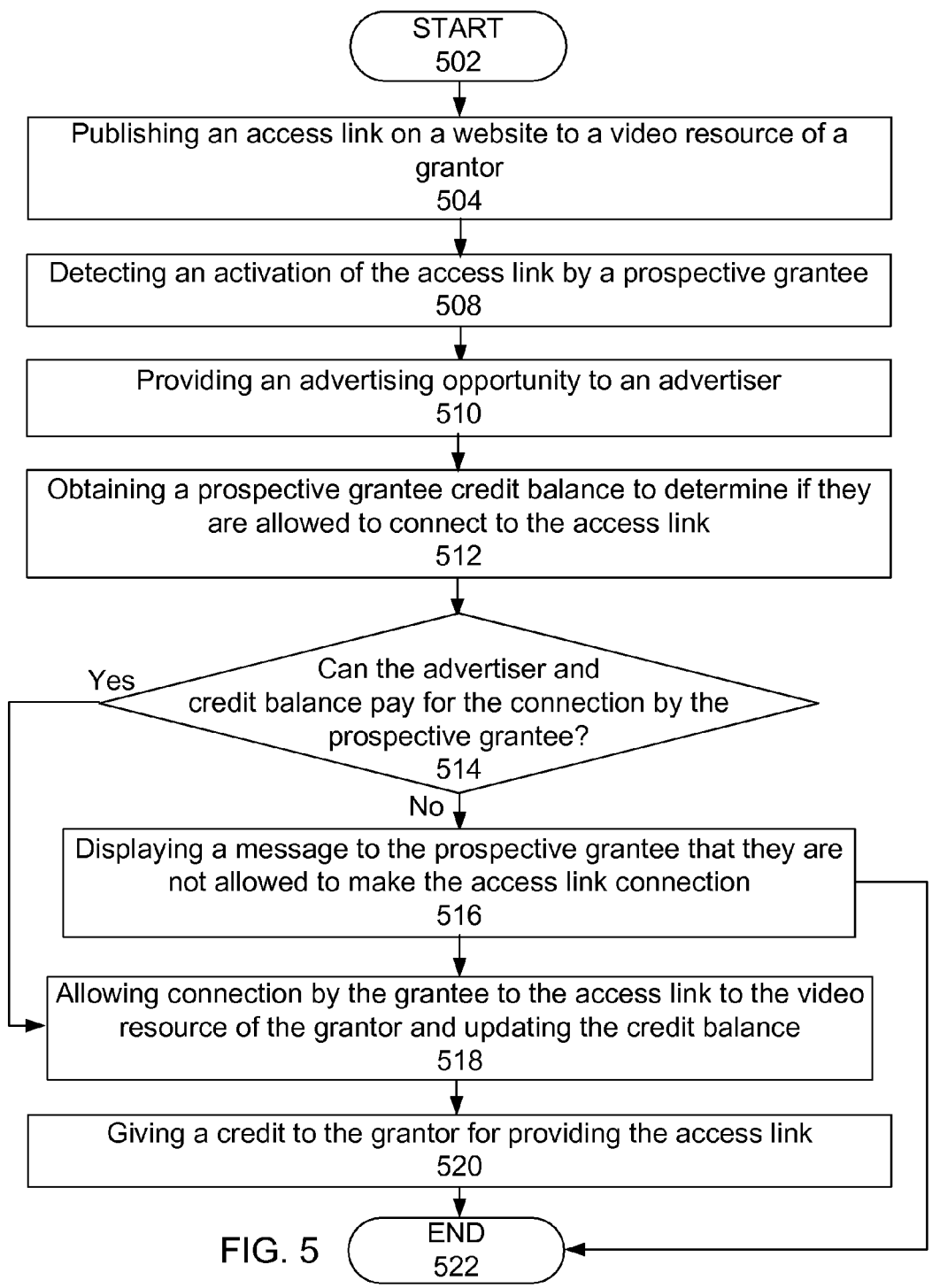
FIG. 5 illustrates a flowchart of a method to operate a remote video resource access system, in accordance with one embodiment of the invention.

FIG. 5 illustrates a flowchart of a method to operate a remote video resource access system, in accordance with one embodiment of the invention. The method starts in operation 502. Operation 504 is next and includes publishing an access link on a website (e.g., a social networking website) to a video resource of a grantor, with information about the video resource being offered, the location, and one or more limits optionally imposed by the grantor on the scope of the access being offered for access. Operation 508 is next and includes detecting activation of the access link by the prospective grantee. Operation 510 is next and includes providing an advertising opportunity to an advertiser (e.g., with advertising based on available information about the grantee, the subject matter of the access link, the geographical location of the grantee, the geographical location of the grantor, or an equivalent) to a prospective advertiser to optionally pay at least a portion of the charge for the access link for the grantee and other costs and fees associated with sharing of copyrighted content. Operation 512 is next and includes obtaining the prospective grantee credit balance from a website user file (e.g., social networking website background file on the user) to determine if the advertiser payment and the prospective grantee payment together can be sufficient for the prospective grantee to be a grantee and allowed to connect to the access link, and if allowed, what limitation should be imposed on the access. If the test of operation 512 determines that the advertiser payment and the prospective grantee credit balance are sufficient to pay for the connection by the prospective grantee, then operation 518 is next. Operation 518 includes allowing a connection by the grantee to the access link to the video resource of the grantor (e.g., for a pre-determined time, channel scope, or an equivalent optionally dependent on the available credit of the grantee). Operation 520 is next and includes giving the grantor a credit for providing the access link to the video resources, optionally in proportion to the duration of time for which they are utilized by the grantee, and updating credit balance of the grantee for getting an access link to the video resources of a grantor, optionally in proportion to the duration of time that they are utilized by the grantee. In one embodiment without full payment for the access link by an advertiser, this operation would also include deducting an appropriate credit or cash price from the credit balance of the grantee for the access link resources, optionally in proportion to the duration of time that they are utilized by the grantee. Operation 522 is next and the end of the method. However, if the test of operation 514 determines there is not enough credit for the prospective grantee, then operation 516 is next. Operation 516 includes displaying a message to the prospective grantee that they are not allowed to make the access link connection, because it is not completely subsidized and they do not have enough credit. Then the method would end in operation 522. In one embodiment of the invention, if no advertiser would completely pay for the prospective grantee access and the prospective grantee doesn't have enough credit to make up for insufficient payment by the advertiser, the prospective grantee would still be allowed to make the access link connection if they pay with cash.

Figure 6:
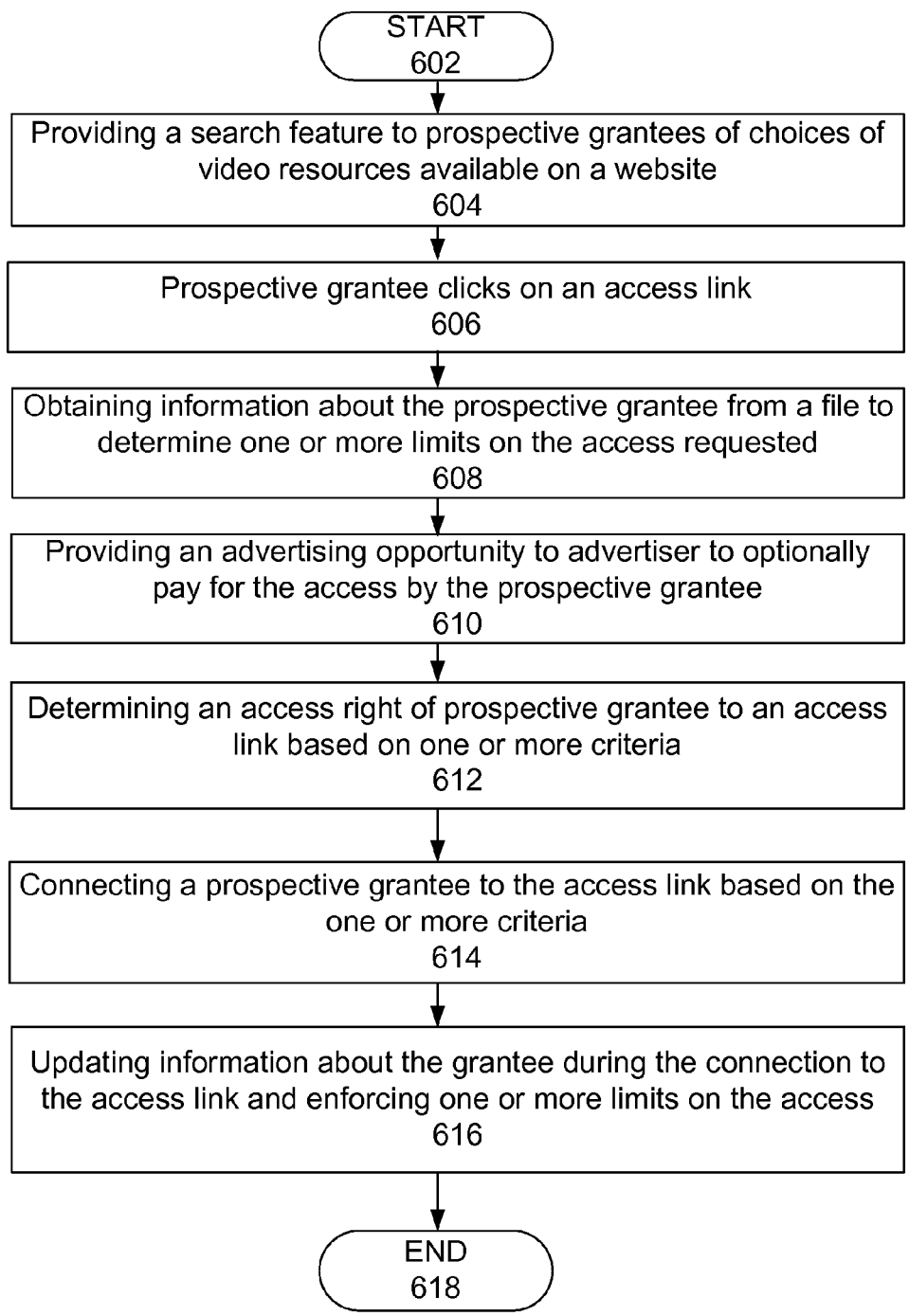
FIG. 6 illustrates a flowchart of a method to operate a remote video resource access system, in accordance with one embodiment of the invention.

FIG. 6 illustrates a flowchart of a method to operate a remote video resource access system, in accordance with one embodiment of the invention. The method starts in operation 602. Operation 604 is next and includes providing to prospective grantees a search feature of choices of video resources available on a website (e.g., a social networking website, or an equivalent). In one embodiment, this would include information about the video resource being offered, the location, and one or more limits optionally imposed by grantor on the scope of the access being offered for access. Operation 606 is next and includes detecting activation of an access link by a prospective grantee. Operation 608 is next and includes obtaining information about the prospective grantee (e.g., identity, credit balance, or an equivalent) from a website user file (e.g., social networking website background file on the user). Operation 610 is next and includes providing an advertising opportunity to an advertiser to optionally pay for the access link and other costs and fees associated with sharing of copyrighted content. Operation 612 is next and includes determining the access right of the prospective grantee based on one or more criteria to determine if the prospective grantee should be a grantee and allowed to connect to the access link of the grantor. Operation 614 is next and includes connecting the prospective grantee to the access link based on one or more criteria. Operation 616 is next and includes updating information about the grantee during the connection to the access link and enforcing one or more limits optionally imposed by grantor on the scope of the access being offered (e.g., a pre-determined time, channel scope, or an equivalent). The method ends in operation 618.

Figure 7:
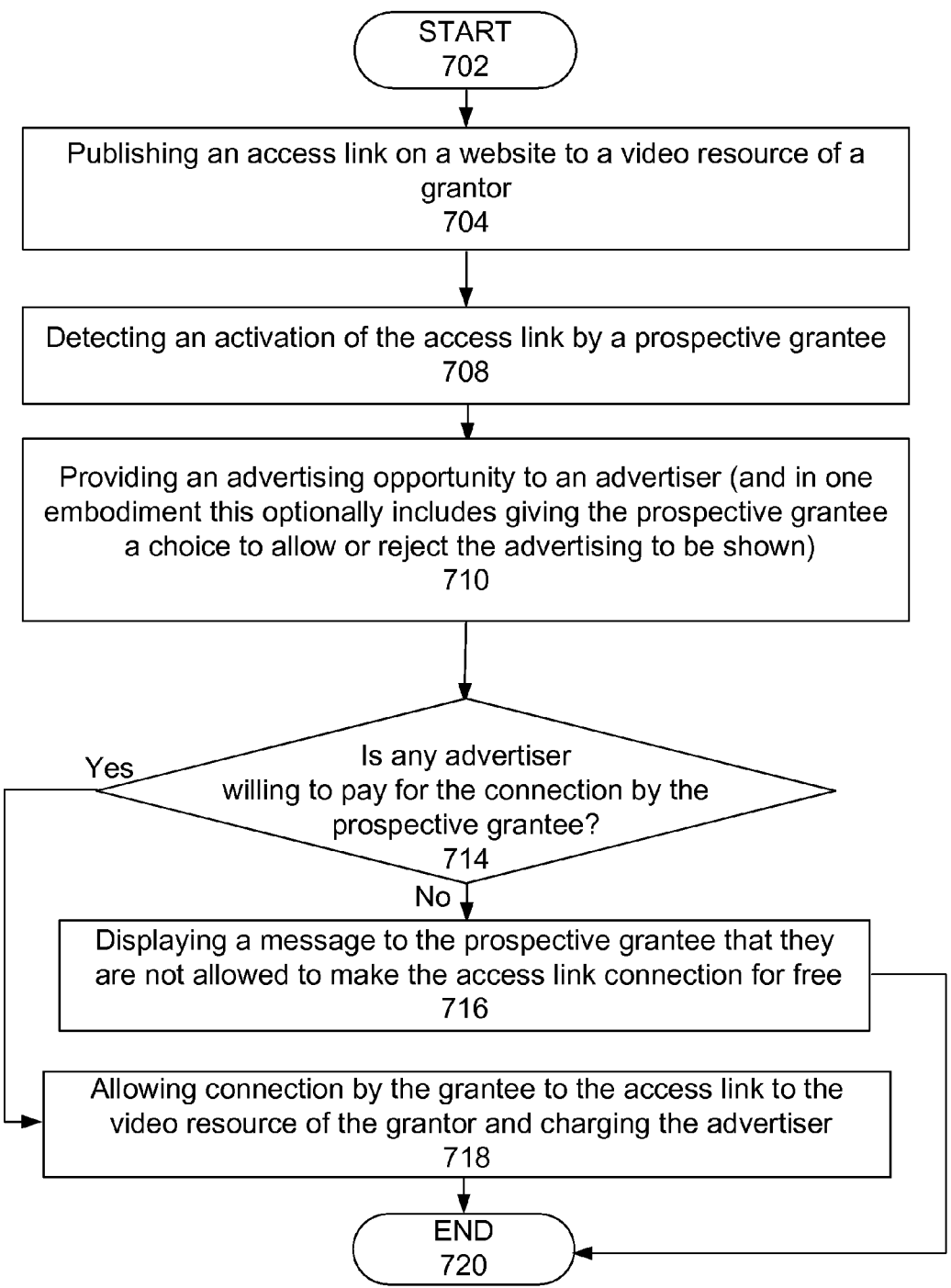
FIG. 7 illustrates a flowchart of a method to operate a remote video resource access system, in accordance with one embodiment of the invention.

FIG. 7 illustrates a flowchart of a method to operate a remote video resource access system, in accordance with one embodiment of the invention. The method starts in operation 702. Operation 704 is next and includes publishing an access link on a website (e.g., a social networking website) to a video resource of a grantor, with information about the video resource being offered, the location, and one or more limits optionally imposed by grantor on the scope of the access being offered for access. Operation 708 is next and includes detecting activation of the access link by the prospective grantee. Operation 710 is next and includes providing an advertising opportunity to an advertiser (e.g., with advertising based on available information about the grantee, the subject matter of the access link, the geographical location of the grantee, the geographical location of the grantor, or an equivalent) to a prospective advertiser regarding the grantee. Operation 714 is next and includes determining if any advertiser is interested in advertising to the prospective grantee of the access link. In one embodiment of the method, the prospective grantee is given a choice to allow or reject the advertising to be shown. If the test of operation 714 determines that there is an advertiser willing to pay for the connection by the prospective grantee and, optionally, the advertising is allowed by the grantee, then operation 718 is next. Operation 718 includes allowing a connection by the grantee to the access link to the video resource of the grantor (e.g., for a pre-determined time, channel scope, or an equivalent) and charging the advertiser who agreed to pay for it. Operation 720 is next and the end of the method. However, if the test of operation 714 determines there is no advertiser willing to pay for the access of the prospective grantee or, optionally, the grantee has rejected the advertising to be shown, then operation 716 is next. Operation 716 includes displaying a message to the prospective grantee that they are not allowed to make the access link connection for free. In one embodiment of the invention, if no advertiser would pay for the prospective grantee access, the prospective grantee would be allowed to make the access link connection if they pay with cash or credits for the access link connection. Then the method would end in operation 720.

Figure 8:
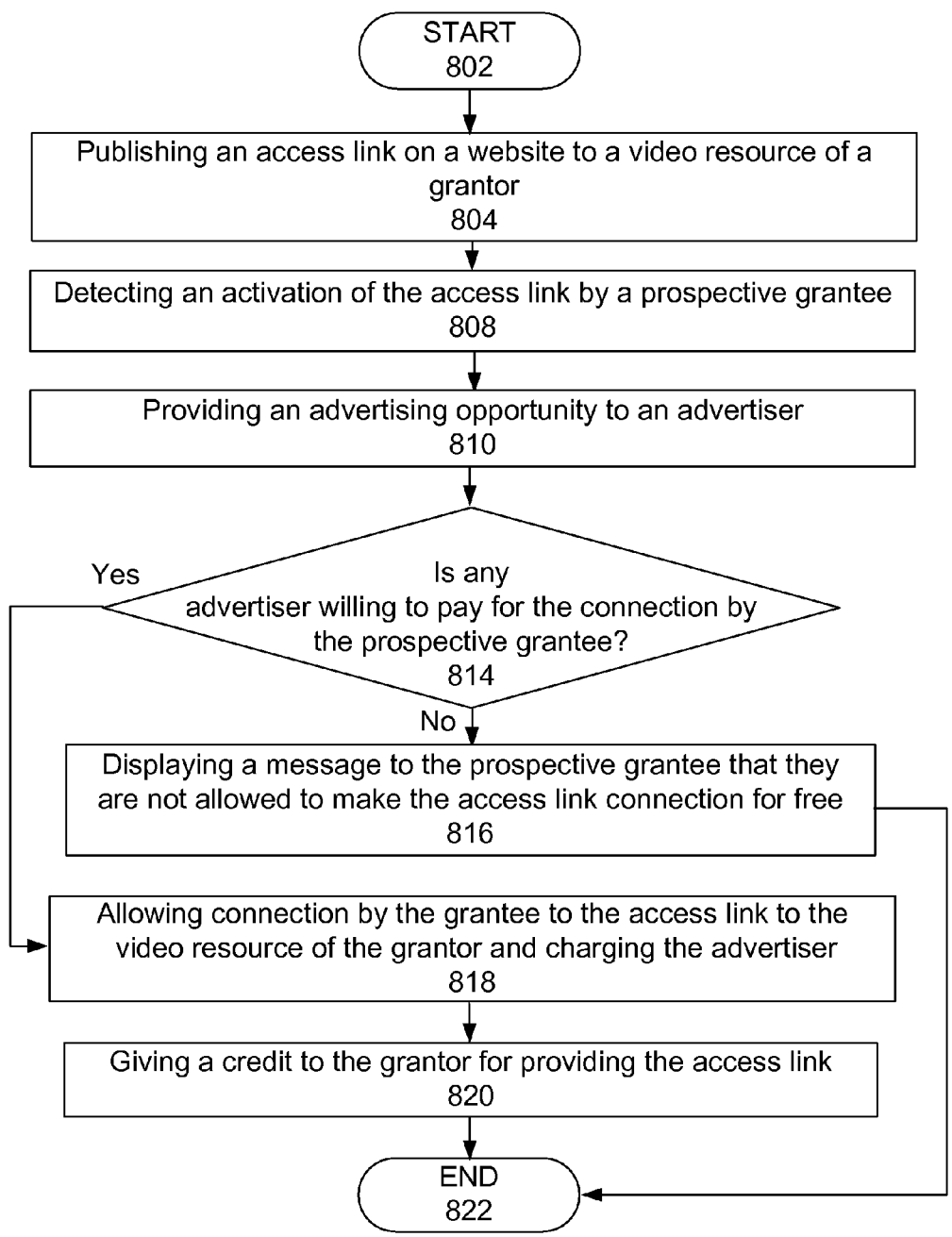
FIG. 8 illustrates a flowchart of a method to operate a remote video resource access system, in accordance with one embodiment of the invention.

FIG. 8 illustrates a flowchart of a method to operate a remote video resource access system, in accordance with one embodiment of the invention. The method starts in operation 802. Operation 804 is next and includes publishing an access link on a website (e.g., a social networking website) to a video resource of a grantor, with information about the video resource being offered, the location, and one or more limits optionally imposed by grantor on the scope of the access being offered for access. Operation 808 is next and includes detecting activation of the access link by the prospective grantee. Operation 810 is next and includes providing an advertising opportunity to an advertiser (e.g., with advertising based on available information about the prospective grantee, the subject matter of the access link, the geographical location of the grantee, the geographical location of the grantor, or an equivalent) to a prospective advertiser to optionally pay for the access link of the prospective grantee and other costs and fees associated with sharing of copyrighted content. Operation 814 is next and includes determining if any advertiser is interested in advertising to the prospective grantee for the access link. If the test of operation 814 determines that there is an advertiser willing to pay for the connection by the prospective grantee, then operation 818 is next. Operation 818 includes allowing a connection by the grantee to the access link to the video resource of the grantor (e.g., for a pre-determined time, channel scope, or an equivalent) and charging the advertiser who agreed to pay for it. Operation 820 is next and includes giving a credit to the grantor for providing the access link to the video resources, optionally in proportion to the duration of time for which they are utilized by the grantee. In an alternative embodiment without full payment for the access link by an advertiser, this operation would also include deducting an appropriate credit or cash price from the credit balance of the grantee for getting access to the video resources of a grantee, optionally in proportion to the duration of time that they are utilized by the grantee. Operation 822 is next and the end of the method. However, if the test of operation 814 determines there is no advertiser willing to pay for the access of the prospective grantee, then operation 816 is next. Operation 816 includes displaying a message to the prospective grantee that they are not allowed to make the access link connection for free. Then the method would end in operation 822. In one embodiment of the invention, if no advertiser would pay for the prospective grantee access, the prospective grantee would be allowed to make the access link connection if they pay with cash or credits for the access link connection.

For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

Several embodiments of the invention are possible. The exemplary embodiments described herein are for purposes of illustration and are not intended to be limiting. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Therefore, those skilled in the art will recognize that other embodiments could be practiced without departing from the scope and spirit of the claims set forth below.

What is claimed is:

1. A method to operate a remote video resource access system, comprising:

publishing an access link on a website to a video resource of a grantor;

detecting, by the remote video resource access system, activation of the access link by a prospective grantee;

obtaining the prospective grantee identity from a website user file to determine if the prospective grantee should be a grantee;

determining, by the remote video resource access system, if the prospective grantee will have downloading access to the access link without requiring any payment from the prospective grantee or without the prospective grantee being subject to any advertising;

determining, by the remote video resource access system, if the prospective grantee must provide payment for downloading access to the access link and collecting payment from the prospective grantee before providing downloading access to the access link;

determining, by the remote video resource access system, if the prospective grantee will be subject to advertising and if so then providing an advertising opportunity to a prospective advertiser regarding the prospective grantee; and granting the prospective grantee video downloading access to the video resource of the grantor, within one or more limits imposed by the grantor on the scope of the video downloading access being offered, without permanent and inescapable association of an advertisement to the video resource of the grantor, giving the prospective grantee a choice of allowing or rejecting advertising to be shown during the access to the video resource of the grantor, using one or more data processing systems specifically programmed with software to implement these functions.

2. The method of claim 1 further comprising:

giving a credit to the grantor for providing the access link.

3. The method of claim 1 further comprising:

deducting from a credit balance of the grantee during access to the video resource.

4. The method of claim 1 further comprising:

providing an advertising opportunity to an advertiser, with advertising based on a factor chosen from the list of: an available information about the prospective grantee, the subject matter of the access link, the geographical location of the prospective grantee, the geographical location of the grantor, or a combination of one or more of the preceding factors.

5. The method of claim 1 further comprising:

publishing information about the video resource being offered by the grantor, the location, and one or more limits imposed by the grantor on the scope of access being offered.

6. The method of claim 1, wherein the website is a social networking website.

7. A method to operate a remote video resource access system, comprising:

publishing an access link on a website to a video resource of a grantor;

detecting, by the remote video resource access system, activation of the access link by a prospective grantee;

obtaining the prospective grantee information from a file to determine if the prospective grantee should be a grantee; and determining, by the remote video resource access system, if the prospective grantee will have downloading access to the access link without requiring any payment from the prospective grantee or without the prospective grantee being subject to any advertising;

determining, by the remote video resource access system, if the prospective grantee must provide payment for downloading access to the access link and collecting payment from the prospective grantee before providing downloading access to the access link; and determining, by the remote video resource access system, if the prospective grantee will be subject to advertising and if so then granting the prospective grantee video downloading access to the video resource of the grantor, within one or more limits imposed by the grantor on the scope of the video downloading access being offered, without permanent and inescapable association of an advertisement to the video resource of the grantor, giving the prospective grantee a choice of allowing or rejecting advertising to be shown during the access to the video resource of the grantor, using one or more data processing systems specifically programmed with software to implement these functions.

8. The method of claim 7 further comprising:
giving a credit to the grantor for providing the access link.

9. The method of claim 7 further comprising:
deducting from a credit balance of the grantee during access to the video resource.

10. The method of claim 7, wherein the credit balance of the grantee is composed of at least one credit obtained from being a grantor of an access link on a website.

11. The method of claim 7 further comprising:
providing an advertising opportunity to an advertiser, with advertising based on a factor chosen from the list of: an available information about the prospective grantee, the subject matter of the access link, the geographical location of the prospective grantee, the geographical location of the grantor, or a combination of one or more of the preceding factors.

12. The method of claim 7 further comprising:
publishing information about the video resource being offered by the grantor, the location, and one or more limits optionally imposed by the grantor on the scope of access being offered.

13. A remote video resource access system, comprising:
a processor;
an access link publication module to publish an access link on a website to a video resource of a grantor;
an access activation module to detect, by the remote video resource access system, activation of the access link by a prospective grantee;
an identification module to obtain the prospective grantee identity from a website user file to determine if the prospective grantee should be a grantee;
a first determination module to determine, by the remote video resource access system, if the prospective grantee will have downloading access to the access link without requiring any payment from the prospective grantee or without the prospective grantee being subject to any advertising;
a second determination module to determine, by the remote video resource access system, if the prospective grantee must provide payment for downloading access to the access link and collecting payment from the prospective grantee before providing downloading access to the access link;
a third determination module to determine, by the remote video resource access system, if the prospective grantee will be subject to advertising and if so then activating an advertising decision module to provide an advertising opportunity to a prospective advertiser regarding the prospective grantee; and
an access decision module to grant the prospective grantee video downloading access to the video resource of the grantor, within one or more limits optionally imposed by the grantor on the scope of the video downloading access being offered, without permanent and inescapable association of an advertisement to the video resource of the grantor, giving the prospective grantee a choice of allowing or rejecting advertising to be shown during the access to the video resource of the grantor, using one or more data processing systems specifically programmed with software to implement these modules.

14. The system of claim 13 further comprising:
a module to give a credit to the grantor for providing the access link.

15. The system of claim 13 wherein the access decision module deducts a charge from a credit balance of the grantee during access to the video resource.

16. The system of claim 13 wherein the advertising decision module provides an advertising opportunity to an advertiser, with advertising based on a factor chosen from the list of: an available information about the prospective grantee, the subject matter of the access link, the geographical location of the prospective grantee, the geographical location of the grantor, or a combination of one or more of the preceding factors.

17. The system of claim 13 wherein the access link publication module publishes information about the video resource being offered by the grantor, the location, and one or more limits optionally imposed by the grantor on the scope of access being offered.

18. The system of claim 13, wherein the website is a social networking website.

19. A method to operate a remote video resource access system, comprising:
publishing an access link on a website to a video resource of a grantor;
publishing information about the video resource being offered by the grantor, the location, and one or more limits optionally imposed by the grantor on the scope of access being offered;
detecting, by the remote video resource access system, activation of the access link by a prospective grantee;
obtaining the prospective grantee information from a file to determine if the prospective grantee should be a grantee;
determining, by the remote video resource access system, if the prospective grantee will have downloading access to the access link without requiring any payment from the prospective grantee or without the prospective grantee being subject to any advertising;
determining, by the remote video resource access system, if the prospective grantee must provide payment for downloading access to the access link and collecting payment from the prospective grantee before providing downloading access to the access link; and
determining, by the remote video resource access system, if the prospective grantee will be subject to advertising and if so then granting the prospective grantee video downloading access to the video resource of the grantor, within one or more limits optionally imposed by the grantor on the scope of the video downloading access being offered, without permanent and inescapable association of an advertisement to the video resource of the grantor, giving the prospective grantee a choice of allowing or rejecting advertising to be shown during the access to the video resource of the grantor, using one or more data processing systems specifically programmed with software to implement these functions.

20. A non-transitory machine-readable medium having machine-executable instructions to operate at a remote video resource access system, comprising:
a module having one or more machine-executable instructions to publish an access link on a website to a video resource of a grantor;
a module having one or more machine-executable instructions to detect, by the remote video resource access system, activation of the access link by a prospective grantee;
a module having one or more machine-executable instructions to obtain the prospective grantee identity from a website user file to determine if the prospective grantee should be a grantee;
a module having one or more machine-executable instructions to determine, by the remote video resource access system, if the prospective grantee will have downloading access to the access link without requiring any payment from the prospective grantee or without the prospective grantee being subject to any advertising;

a module having one or more machine-executable instructions to determine, by the remote video resource access system, if the prospective grantee must provide payment for downloading access to the access link and collecting payment from the prospective grantee before providing downloading access to the access link;

a module having one or more machine-executable instructions to determine, by the remote video resource access system, if the prospective grantee will be subject to advertising;

a module having one or more machine-executable instructions to provide an advertising opportunity to a prospective advertiser regarding the prospective grantee; and a module having one or more machine-executable instructions to grant the prospective grantee video downloading access to the video resource of the grantor, within one or more limits optionally imposed by the grantor on the scope of the video downloading access being offered, without permanent and inescapable association of an advertisement to the video resource of the grantor, using one or more data processing systems specifically programmed with software to implement these modules.

* * * * *